(12) United States Patent
Chen et al.

(10) Patent No.: US 11,256,864 B2
(45) Date of Patent: Feb. 22, 2022

(54) CONTACTS AUTOCOMPLETE KEYBOARD

(71) Applicant: Apple Inc., Cupertino, CA (US)

(72) Inventors: Zeheng Chen, Los Gatos, CA (US);
Jessica Aranda, Santa Clara, CA (US);
Patrick Coffman, Cupertino, CA (US);
Patrick W. Demasco, San Francisco, CA (US); Julien Freudiger, San Francisco, CA (US); Karan Misra, Newark, CA (US); Stephen J. Rhee, San Jose, CA (US); Guy L. Tribble, Woodside, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 17/183,008

(22) Filed: Feb. 23, 2021

(65) Prior Publication Data

US 2021/0397789 A1     Dec. 23, 2021

Related U.S. Application Data

(60) Provisional application No. 63/041,784, filed on Jun. 19, 2020.

(51) Int. Cl.
*G06F 3/0486* (2013.01)
*G06F 40/274* (2020.01)
*G06F 9/54* (2006.01)
*G06F 3/04886* (2022.01)

(52) U.S. Cl.
CPC ........ *G06F 40/274* (2020.01); *G06F 3/04886* (2013.01); *G06F 9/547* (2013.01)

(58) Field of Classification Search
CPC ......... G06F 40/30; G06F 3/04817; G06F 9/52
See application file for complete search history.

(56) References Cited

U.S. PATENT DOCUMENTS

| 8,713,042 | B1 | 4/2014 | Zinenko et al. |
| 9,678,933 | B1 | 6/2017 | Phillips et al. |
| 10,110,708 | B2 | 10/2018 | Zhang |
| 2004/0119732 | A1* | 6/2004 | Grossman ............... G06Q 10/10 715/708 |
| 2005/0047575 | A1* | 3/2005 | Parker ................. H04M 3/5108 379/211.02 |
| 2013/0326368 | A1* | 12/2013 | Voas ....................... G06Q 50/32 715/753 |
| 2014/0104177 | A1* | 4/2014 | Ouyang ................ G06F 3/0237 345/168 |
| 2015/0302301 | A1* | 10/2015 | Petersen .............. G06Q 10/107 706/11 |

(Continued)

*Primary Examiner* — Rayeez R Chowdhury
(74) *Attorney, Agent, or Firm* — Morgan, Lewis & Bockius LLP

(57) ABSTRACT

Private and secure autocomplete suggestions are enabled based on a user contacts database, even when an application has not been granted access to the user contacts database. A keyboard process can receive and display suggestions based on input provided via the keyboard. The suggestions are generated based on a contacts database of a user. The suggestions are generated without exposing the contacts database to the application. Suggestions are then displayed to the user without exposing the suggestions to the application. Once a suggestion is selected by a user, the selected suggestion is provided to the application for insertion into a text field.

20 Claims, 13 Drawing Sheets

(56) References Cited

U.S. PATENT DOCUMENTS

| | | | |
|---|---|---|---|
| 2015/0355836 A1* | 12/2015 | Gummadidala | G06F 3/0237 |
| | | | 715/773 |
| 2016/0357761 A1* | 12/2016 | Siracusa | G06F 16/3322 |
| 2017/0163770 A1* | 6/2017 | Zhang | H04L 67/42 |
| 2017/0308587 A1* | 10/2017 | Nagel | G06F 3/0236 |
| 2018/0095970 A1* | 4/2018 | Cort | H04L 67/1095 |
| 2018/0239770 A1* | 8/2018 | Ghotbi | G06F 9/453 |

\* cited by examiner

CONTACTS AUTOCOMPLETE KEYBOARD

CROSS-REFERENCE

This application claims the benefit of priority of U.S. Provisional Application No. 63/041,784 filed Jun. 19, 2020 which is incorporated herein by reference.

TECHNICAL FIELD

This disclosure relates generally to mobile electronic devices. More specifically, this disclosure relates to a system and associated methods to enable private and secure autocomplete suggestions based on a user contacts database.

BACKGROUND

A privacy control system provided by an operating system on an electronic device can limit application access to privacy sensitive devices (e.g., camera/microphone) and privacy sensitive data sources (e.g., a contacts database). When an application attempts to access a privacy sensitive device or a privacy sensitive data source, the user is prompted to allow or deny the access. The indicated user preference may be persisted by the privacy control system. A drawback to enabling access to a privacy sensitive data source is that access may be granted to the entire data source. For example, if a user allows an application to access a contacts database, the application may access all contacts in the contacts database. Thus, it would be beneficial to enable limited access to a privacy sensitive data source for a limited purpose.

SUMMARY

Embodiments described herein provide a system and associated methods to enable private and secure autocomplete suggestions based on a user contacts database. A keyboard process can receive and display suggestions based on user input provided via the keyboard. The suggestions are generated based on a contacts database of a user. The suggestions are generated without exposing the contacts database to the application. Suggestions are then displayed to the user without exposing the suggestions to the application. Only once a suggestion is selected by a user is the selected suggestion provided to the application for insertion into a text field.

One embodiment provides an electronic device comprising a display device, a memory device coupled with the display device, an input device, and one or more processors coupled with the display device, the memory device, and the input device. The one or more processors can be configured to execute instructions stored in the memory device, where the instructions cause the one or more processors to detect selection of a text field displayed via a user interface of the electronic device, the user interface displayed on the display device on behalf of an application configured for execution by the one or more processors, detect input of a string into the text field, the string input via the input device, generate one or more autocompletion suggestions based on the string and securely display the one or more autocompletion suggestions within the user interface. To securely display the one or more autocompletion suggestions includes to write the autocompletion suggestions to a portion of the memory that is inaccessible to the application and display, via the display device, the one or more autocompletion suggestions from the portion of the memory. After display of the one or more autocompletion suggestions, the one or more processors can receive, via the input device, selection of an autocompletion suggestion of the one or more autocompletion suggestions and insert the selected autocompletion suggestion into the text field in response to receipt of the selection of the autocompletion suggestion. The application does not have access to the autocompletion suggestions while they are securely displayed. When an autocompletion suggestion is selected, the selected suggestion is made accessible to the application.

One embodiment provides for a method performed by one or more processors of an electronic device. The method comprises detecting selection of a text field displayed via a user interface of the electronic device, where the user interface is displayed for an application executed by the one or more processors. The method additionally includes detecting input of a string into the text field, generating one or more autocompletion suggestions based on the string, and requesting secure display of the one or more autocompletion suggestions within the user interface of the electronic device. Secure display of the one or more autocompletion suggestions enables the one or more autocompletion suggestions to be displayed to the user while preventing the suggestions from being read by the application. For example, the autocompletion suggestions can be displayed from a memory location that is inaccessible to the application. In response to selection of a displayed suggestion, the method further includes inserting the selected autocompletion suggestion into the text field in response to receiving the selection of the autocompletion suggestion.

One embodiment provides for a non-transitory machine-readable medium storing instructions which, when executed by one or more processors of an electronic device, cause the one or more processors to perform operations of a method as described herein. Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
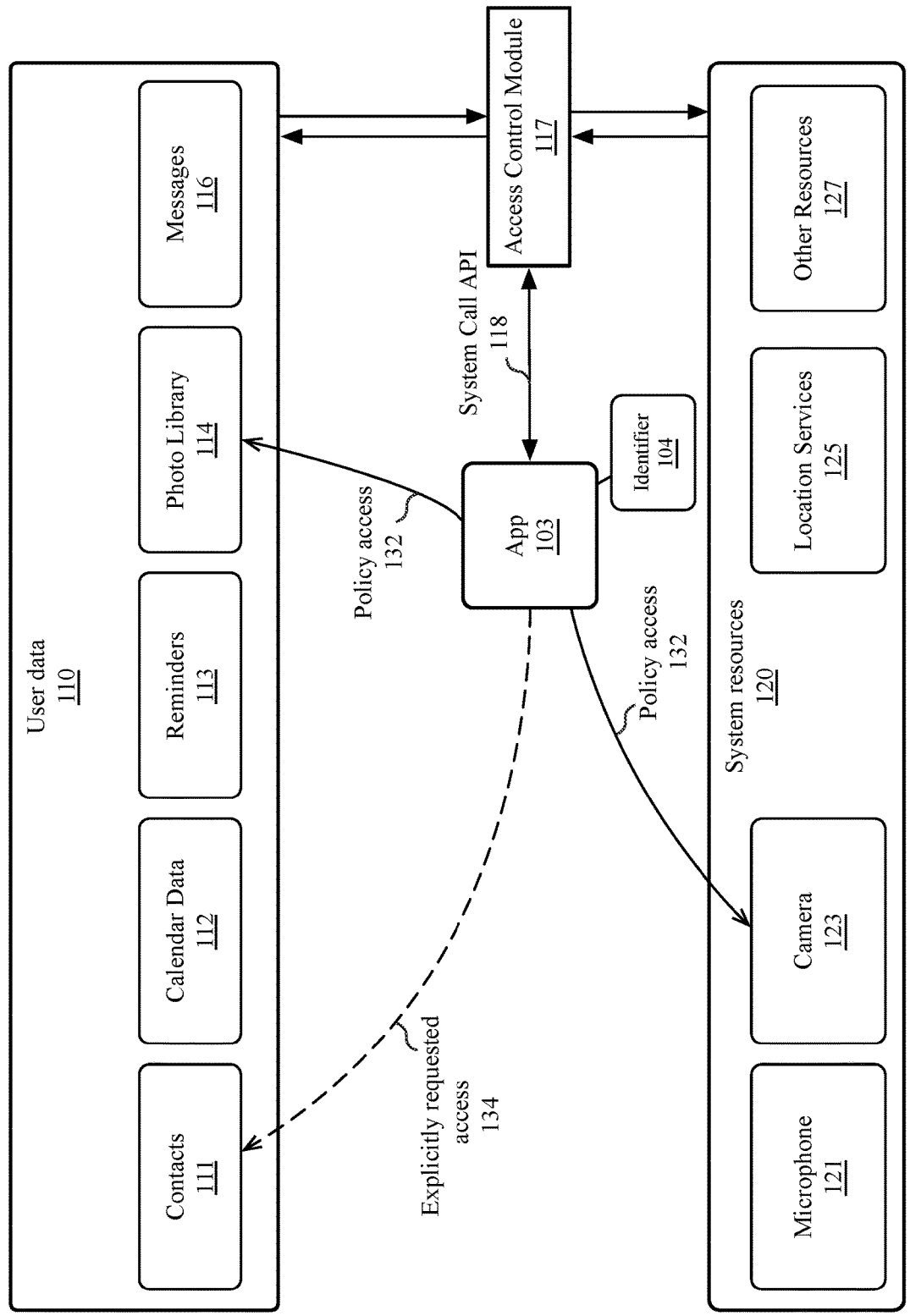
FIG. 1 illustrates a system in which access restrictions are imposed on applications, according to an embodiment.

Embodiments described herein provide a contacts autocomplete keyboard that securely presents autocompletion suggestions based on a contacts database on a mobile device. The autocompletion suggestions may be presented for an application that does not have access to the contacts database on the mobile device. The suggestions are presented in a manner that prevents the application from reading the suggestions. If a suggestion is selected by a user, the selected suggestion can then be provided to the application for insertion into a text field. The suggestion is generated based on the type of text field in which text is to be inserted. Heuristics can be applied to determine the semantic meaning of a text field. The semantic meaning of the text field is used to determine the type of autocompletion suggestions to present to the user. In the event the application also presents autocompletion suggestions for a text field, the contacts autocompletion keyboard can filter duplicate suggestions from the list of suggestions to be presented to the user.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021 Apple Inc.

FIG. 1 illustrates a system 100 in which access restrictions are imposed on applications, according to an embodiment. The system 100 includes user data 110 and system resources 120 that can be accessed by an application 103. Privacy sensitive elements of the user data 110 and system resources can be gated by the system 100 according to access control policies. In one embodiment, access to privacy sensitive user data 110 and system resources 120 is mediated by an access control module 117. User data 110 that is privacy sensitive can be grouped into different classifications including, but not limited to contacts 111, calendar data 112, reminders 113, a photo library 114, and messages 116, where the messages can include text (e.g., SMS) messages, email messages, and/or instant messages via an instant messaging application. System resources 120 that are privacy sensitive include but are not limited to a microphone 121, a camera 123, location services 125, and other resources 127, which can include software resources, hardware resources, or a combination thereof. Access to the user data 110 can be mediated on a per-classification level. Access to system resources 120 can be mediated on a per-resource level. Various additional types of privacy sensitive information can be protected by the system 100 as either a classification of user data 110 or other types of privacy sensitive resources 120, including but not limited to message history, web browser data (e.g., browser history, cookie data, etc.), system backup data, and any type of location history data that may be stored by the system 100.

In one embodiment, the access control module 117 is a system daemon through which an application 103 can communicate with via a system call API 118, such as an inter-process communication (IPC) call. The application includes an identifier 104 that is used to identify the application to the access control module 117. In one embodiment, the identifier 104 is a universally unique identifier. In one embodiment, the identifier 104 is unique per-system. In one embodiment the identifier 104 is unique per-user.

An application 103 can be provided access to a limited set of resources by default. This default access can be a policy-based access (e.g., policy access 132) that is granted to the application 103 based on the standard functionality of the application. For example, if application 103 is a camera application, the application 103 can be given policy access 132 to a camera 123 and photo library 114 based on a policy associated with the application 103. The system 100 can be configured to disallow access to privacy sensitive system resources by default, except for those to which the application 103 is granted policy access 132. In one embodiment, before the application 103 is granted access to user data 110 our system resources 120 outside of policy, the access control module 117 can trigger a graphical interface prompt by which a user of the system can explicitly grant or deny access to the classification of user data 110 or system resources 120. For example, before application 103 can access the contacts 111 of a user, the application 103 performs a call through the system call API 118 to the access control module 117 to explicitly request access 134 to the contacts 111. The user can then grant or deny access to the contacts 111.

Figure 2:
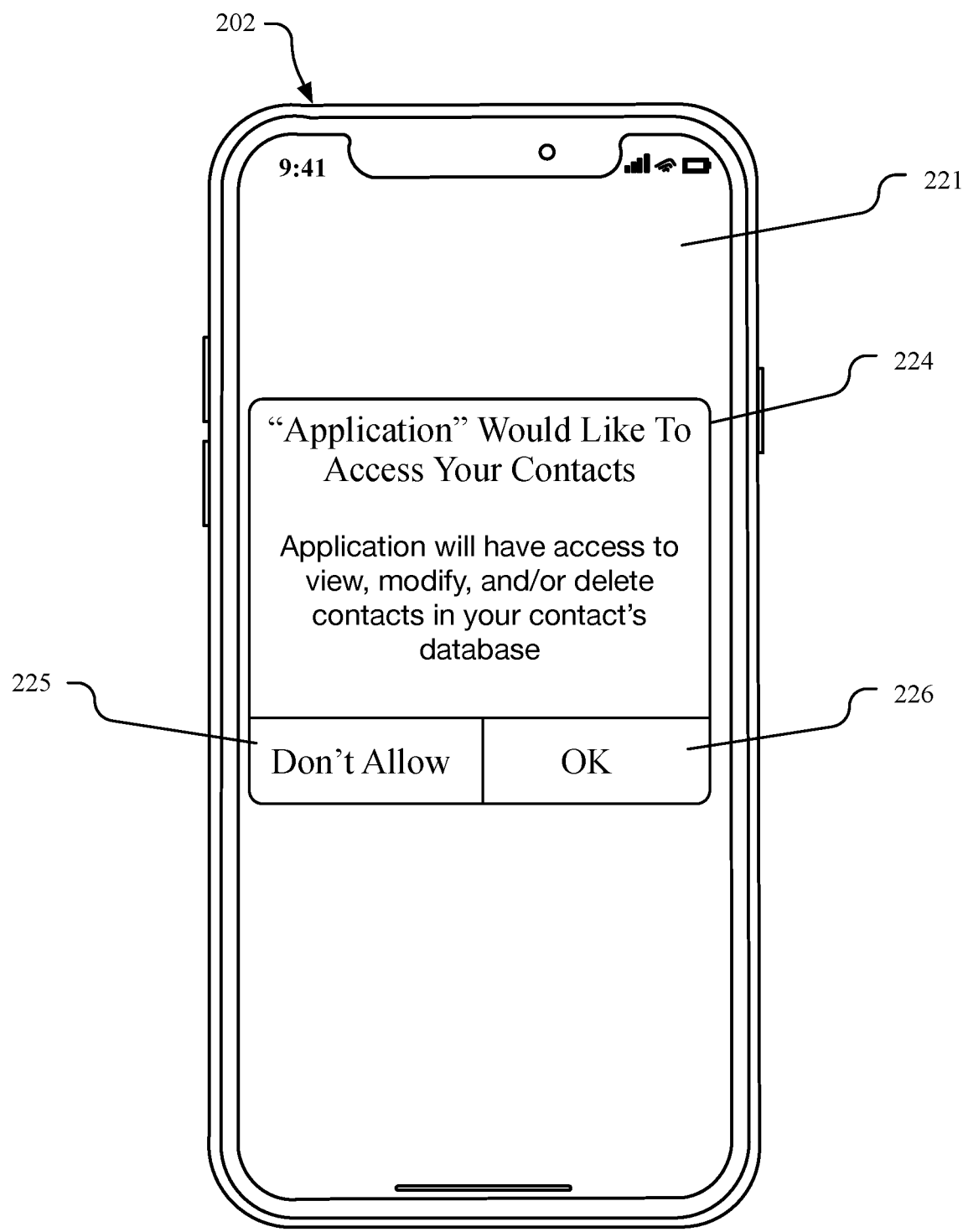
FIG. 2 illustrates a prompt by which an application can request access to the contacts of a user.

FIG. 2 illustrates a prompt by which an application can request access to the contacts of a user. When an application is to access contacts of a user that are stored in a contacts database of a mobile device 202, the application can cause a prompt 224 to be presented on a display 221 of the mobile device 202. The prompt can indicate that the application is requesting access to the contacts of the user. A first interface element 225 may be presented that enables the user to block ("don't allow") access to the contacts of the user. A second interface element 226 may be presented to allow ("OK") the application to access the contacts of the user. Once the application is granted access to the contacts 111, the application has access to all contact entries. If the application has a feature that allows contacts-based autocompletion suggestions to be presented in response to input provided by the user, the contacts-based autocompletion functionality of the application will be inoperable if the application cannot access the contacts of the user.

Techniques described herein provide a keyboard that enables autocompletion within an application based on data derived from a contacts database without exposing the entire contents of the contacts database to the application. If a user does not wish to provide the application access to the entirety of the contacts database, autocompletion suggestions can be generated outside of the process of the application. One or more autocompletion suggestions can be presented to the user in a secure manner that prevents the application from reading the one or more autocompletion suggestions. If an autocompletion suggestion is selected by the user, the selected suggestion can be provided to the application.

The contacts autocomplete keyboard is a keyboard application that includes an in-process keyboard portion that executes within the process space of an application and an out-of-process keyboard portion that executes outside of the process space of the application. The in-process and out-of-process keyboard portions can communicate and exchange information. Based on text input via the in-process keyboard, the out-of-process keyboard can receive suggestions from autocomplete suggestion sources. The type of suggestions can vary based on the text input field for which the suggestion is generated. The type of suggestions can include the names of contacts, the address of contacts, the phone number of contacts, or other contact database fields.

The fields of the contacts database to use to generate suggestions can be determined based on the semantic meaning of the text input field for which suggestions will be provided. An application can use a text input field API to declare a semantic meaning for a text input field. However, many applications do not make use of the API and do not explicitly declare the semantic meaning for text input fields. Where a semantic meaning isn't declared for a field, the contacts autocomplete keyboard can use heuristics to determine the purpose of a text input field, enabling the determination of the appropriate type of suggestion to provide for the field even when a meaning is not declared.

Input field heuristics include, for example whether the text field is a search text field, keywords associated with the text input field, and placeholder text for the text input field. Additional heuristics include whether the application supports an automobile infotainment interface (e.g., Apple Car Play, Android Auto). Metadata associated with a text input field can indicate whether the field expects a phone number, and address, a name, an employer, a business name, or other types of data. Once a determination is made as to the type of input expected by a text input field, one or more suggestion engines can analyze the contacts database in light of text input and the type of input expected by the text input field. The one or more suggestion engines can then generate a set of suggestions that may be provided for the text input field. The top suggestion can then be securely displayed to a user.

The top suggestion is securely displayed to the user by drawing the user interface element that displays the one or more top suggestions outside of the process of the application. The out-of-process portion of the keyboard can display, via the window manager of the operating system of the electronic device, can display the one or more top suggestions in a manner that prevents those suggestions from being viewed by the application. The in-process portion of the keyboard can be notified that a suggestion will be displayed. The in-process portion of the keyboard can draw a blank suggestion regions on top of the keyboard view. The out-of-process portion of the keyboard can then request for the window manager to render the one or more top suggestions within the bank suggestion region. The rendered one or more suggestions cannot be read by the application, but can be read by a user of the electronic device. In response to the selection of a suggestion by the user, the selected suggestion can be presented to the application and provided as input to the text input field.

In scenarios in which the application is also able to generate its own suggestions, either because the application was granted access to the contacts database or because the application has an alternate data source from which suggestions may be generated, the suggestions that are presented to the user by the out-of-process keyboard can be filtered relative to the suggestions that are presented by the application to prevent the presentation of duplicate suggestions. The suggestions presented by the application can be determined by viewing the text displayed by the application via the view hierarchy of the application as presented to the user interface framework by the application.

The contacts autocomplete keyboard also works automatically across languages. The signals used by the autocomplete keyboard to generate autocompletion suggestions are localized strings. The string matching can be performed in English and automatically localized via the user interface (UI) framework.

During operation, when a user taps a view that is defined as a text input field, a virtual keyboard is presented in the UI by the operating system. Operating system logic applies heuristics to determine the type of text field that is presented. In one embodiment the keyboard that is presented within an application may operate partially within the process space of the application and communicate with keyboard logic that is outside of the process space of the application. In one embodiment, the keyboard may be entirely out-of-process of the application and the application may use a system programming interface to interact with out-of-process keyboard logic. Text that is input into the text field is sent to the out-of-process keyboard logic, then relayed to one or more suggestion daemons that can use the determined type of text field and the input text string to generate suggestions from the contacts database. The top one or more matches are asynchronously relayed by the suggestion daemon to the out-of-process keyboard logic. Suggestions that are duplicative of suggestions generated by the application can be filtered, either by the out-of-process keyboard or by the suggestion daemon. The out-of-process keyboard logic can then ask the rendering server to render secure content in the form of the one or more top suggestions. The one or more top suggestions are securely rendered on top of the in-process keyboard view for the application in a manner that prevents the application from viewing the suggestions. When a user selects a suggestion candidate, the text of the suggestion candidate is inserted into the text field of the application. The application can see only this final string that is inserted in the text field. Specific details of various embodiments that present a contacts autocompletion keyboard are described below.

Figure 3:
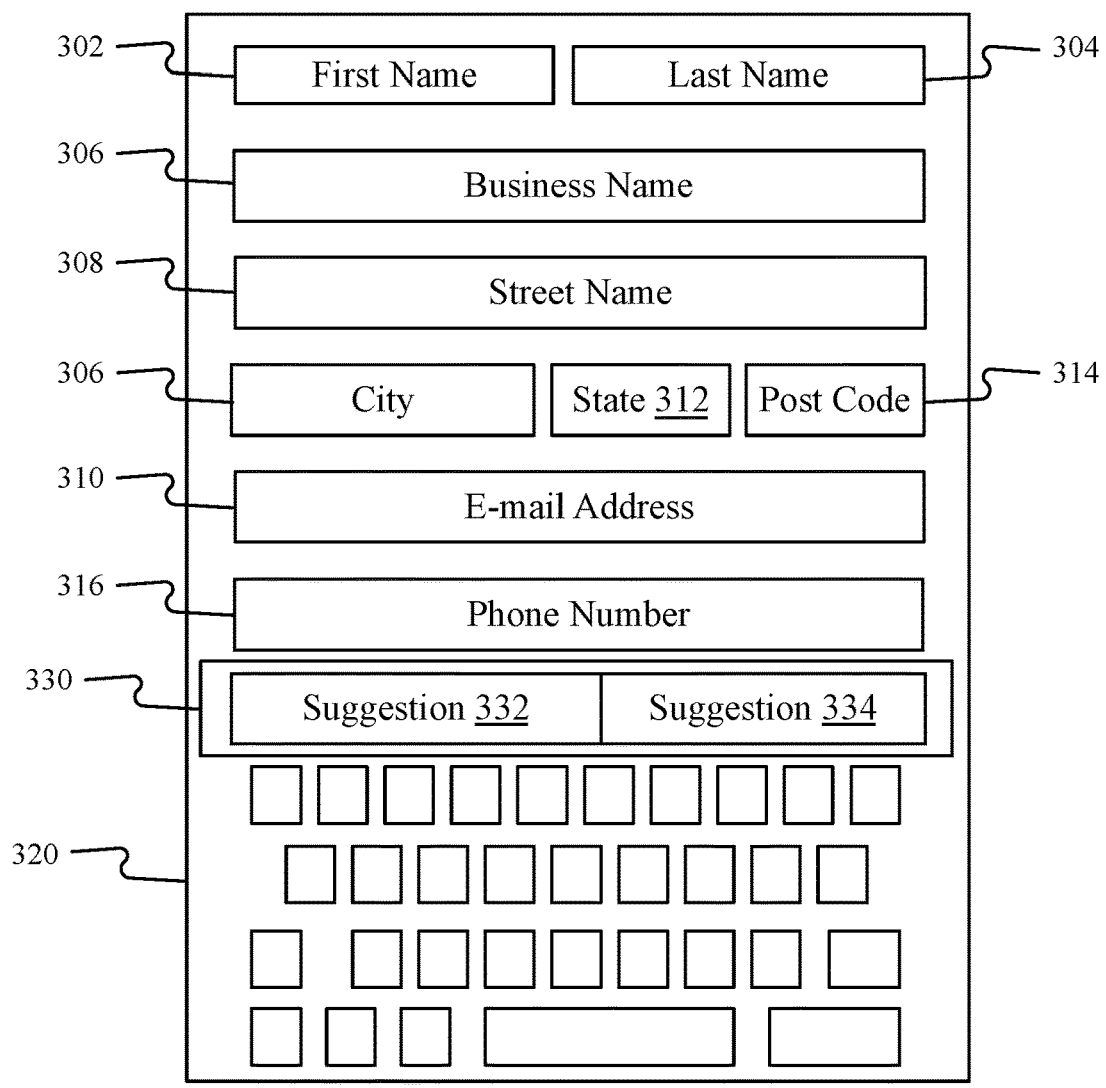
FIG. 3 is an illustration of an example graphical user interface including a contacts autocompletion keyboard for presenting contacts-based user autocompletion suggestions.

FIG. 3 is an illustration of an example graphical user interface including a contacts autocompletion keyboard for presenting contacts-based user autocompletion suggestions. GUI 300 can be presented by a host software application (e.g., host application) in conjunction with one or more operating system managed interface elements. The host application can be a web browser, special purpose software application, or third party software application created by an entity that is different than the entity that created the computing device and/or operating system of the computing device. Aspects of the GUI 300 may be presented by operating system components of the computing device, such as a window manager of the operating system.

In some implementations, GUI 300 can include various data input fields. For example, the data input fields can include text input fields, pull-down menus, scrolling menus, or similar data input fields. The data input fields can be configured to request and/or accept various types of information. For example, in the event that the application is an application associated with a shipping and/or logistics service provider, data input fields 302 and 304 can be configured to accept input specifying a first and last name, respectively of the recipient of a shipment to be sent by the user. Data input field 306 can be configured to accept user input specifying a shipment destination business name. Data input fields 308, 310, 312, and 314 can be configured to accept user input specifying the street name, city, state, and postal code of the shipment destination. Data input field 316 can be configured to accept user input specifying an email address of the shipment recipient. Data input field 316 can be configured to accept user input specifying the phone number of the shipment recipient.

When a user selects one of the data input fields presented on GUI 300, the host application can cause virtual keyboard 320 to be presented on GUI 300. For example, keyboard 320 can be generated and/or presented by a process (e.g., operating system, other process, etc.) external to the host application. When the user selects data input field 302 for providing input specifying the user's first name, the host application can cause virtual keyboard 320 to be presented so the user can provide character input specifying the shipment recipient's first name using virtual keyboard 320. The user can provide input to keyboard 320 specifying each character of the shipment recipient's first name and keyboard 320 can provide the character input to the host application as input to data input field 302. The user can then select another data input field presented on GUI 300 and provide character input to the selected data input field through keyboard 320.

As illustrated in the example GUI 300, the user may be required to input potentially a large number of characters to complete the form presented by GUI 300. To simplify the data input process, the application may present autocompletion suggestions to the user based on entries in the contacts of the user, provided that the application has been granted access to the contacts database of the computing device. In the event that the application has not been granted access to the contacts database, the application will be unable to present autocompletion suggestions.

To reduce the amount of input required of a user in such scenario, keyboard 320 can request that a component of the operating system (e.g., window manager) present a secure suggestion bar 330 to enable the presentation of autocompletion suggestions (e.g., suggestion 332 and/or suggestion 334). Suggestions 332 and 334 can be generated based on data in the contacts database, or via other data sources available to operating system of the computing device, and relevant to the currently selected data input field presented on GUI 300.

The suggestions 332 and 334 presented via the secure suggestion bar 330 are presented via UI region that is stored in memory that is inaccessible to the application. Were the application to attempt to examine the secure suggestion bar 330, the application will see a blank UI window. The contents of the secure suggestion bar 330 may be rendered by the window manager before the frame buffer containing the GUI 300 is presented on the display of the computing device. The user information obtained or presented by the secure suggestion bar 330 is only shared with the host application when the user explicitly provides input indicating that the user wishes to share the user information with the host application. When the user selects a suggestion (e.g., suggestion 332) presented by secure suggestion bar 330, an external keyboard and suggestion bar (KSB) process can send the user selected suggestion to the host application as input to the currently selected data input field.

Figure 4:
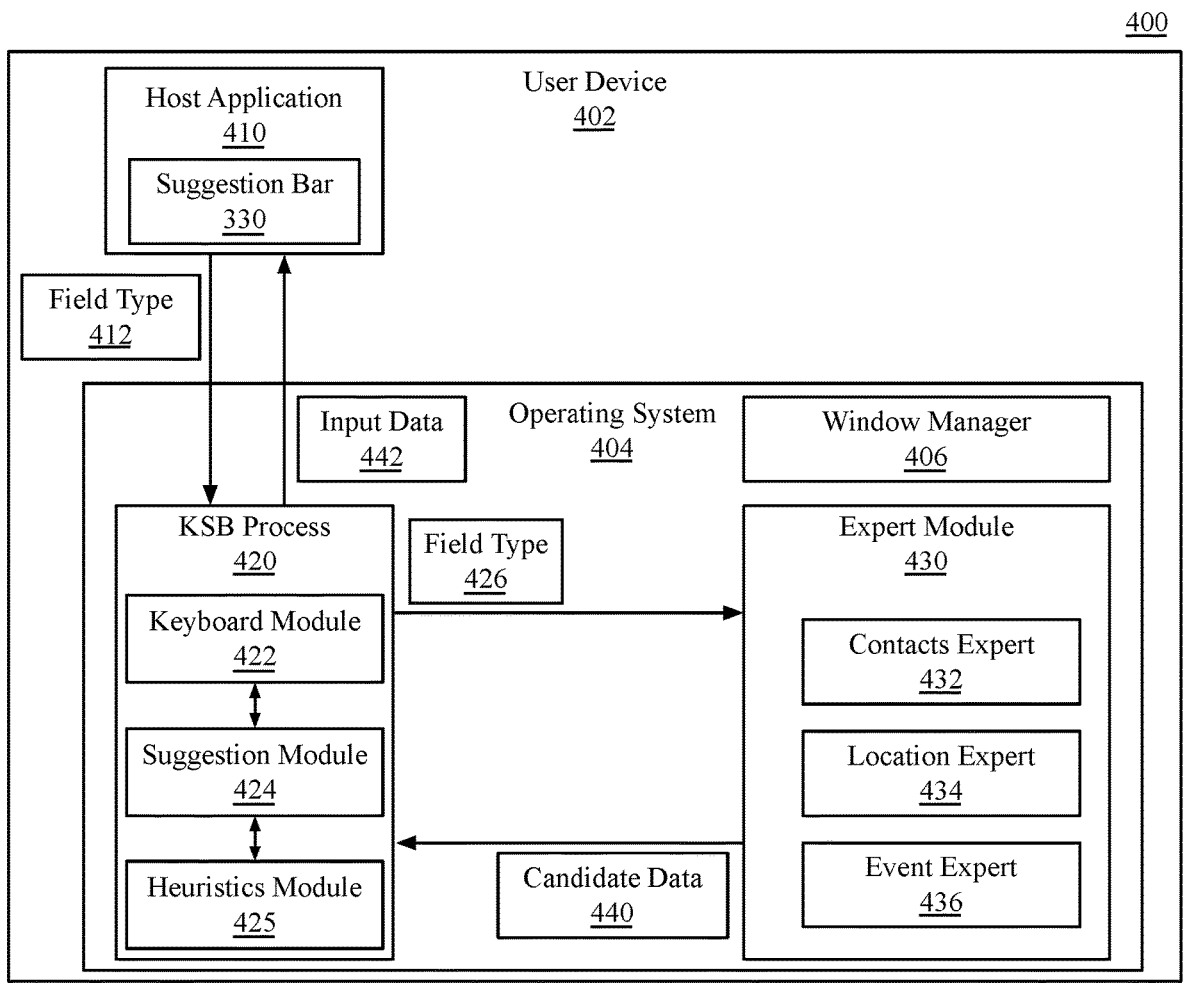
FIG. 4 is a block diagram of a system for securely presenting user information suggestions to an application based on a contacts database.

FIG. 4 is a block diagram of a system 400 for securely presenting user information suggestions to an application based on a contacts database. System 400 includes a user device 402, which may be for example, a desktop computer, laptop computer, mobile device, tablet computer, smartphone, smartwatch, wearable device, or other computing device. User device 402 can be configured with an operating system 404 (e.g., application framework, software libraries, modules, drivers, software components, processes, etc.) that provides application programming interfaces (API), various software services, and/or built-in application features for applications (e.g., first party applications, third party applications, etc.) running on user device 402. User device 402 can execute a host application 410. For example, host application 410 can be a software application installed on user device 402. Host application 410 can be a third-party application built by people and/or entities other than those who built user device 402 and/or the operating system 404. Host application 410 can be configured to present GUI 300, as described above with reference to FIG. 3.

To present keyboard 320 and/or secure suggestion bar 330 on GUI 300, host application 410 can be configured to interact with keyboard and suggestion bar (KSB) process 420. For example, KSB process 420 can be a component of operating system 404 on user device 402. KSB process 420 can be external to host application 410 but can be called by host application 410 to provide keyboard 320 and/or secure suggestion bar 330 in various graphical user interfaces of host application 410, such as in GUI 300 described above. For example, when a user selects a data field of GUI 300, host application 410 can call or invoke KSB process 420 to cause KSB process 420 to present keyboard 320 and/or secure suggestion bar 330 on GUI 300.

KSB process 420 can include keyboard module 422 that is configured to generate and present keyboard 320. KSB process 420 can include suggestion module 424 that is configured to generate and present the secure suggestion bar 330 via the operating system 404. A heuristics module 425 can analyze field context associated with a text entry field to determine a semantic meaning (e.g., field type) for the text field. As KSB process 420 is external to host application 410, contact database suggestions presented by KSB process 420 can be provided to host application 410 through various inter-process API calls only when authorized by the user.

Thus, the data within KSB process 420 is protected from unauthorized access by host application 410.

In one embodiment, at least a portion of the keyboard process may execute within the process of the host application 410. In such embodiment, the in-process portion of the keyboard process may be responsible for drawing the secure suggestion bar 330. To prevent the application from reading the memory of the secure suggestion bar 330 to access suggestions that are displayed to the user, the secure suggestion bar 330 may be rendered as a blank UI region by the in-process portion of the keyboard. The suggestions that are displayed in the secure suggestion bar 330 may be drawn as a text overlay within the region of the UI associated with the secure suggestion bar 330 by a window manager 406 of the operating system 404. The window manager 406 can display the top suggestion candidates received from a suggestion generator (e.g., expert module 430) in response to a request from KSB process 420. The window manager 406 can display the suggestions within the secure suggestion bar 330, while storing the suggestions to be displayed in a memory region that is different from the memory that stores the blank UI region that is visible to the host application 410. For example, the UI that is presented on the display may be composed from multiple separate windows. When the UI is prepared for presentation by the window manager, the window manager may compose the memory region that stores the suggestions received from KSB process 420 on top of the window coordinates associated with the secure suggestion bar 330.

Suggestions based on the contacts database stored in the user device 402 can be generated in response to input data 442 provided by a user for entry into a data field presented on user device 402. System 400 can search the contacts database of the user device 402 for information relevant to the type of data field selected by the user, obtain the relevant user information, and present on a display of user device 402 suggestions as to which of the obtained user information might be most relevant to the selected data field. System 400 can present the information suggestions to the user without providing the contacts database information to the host application by presenting the suggestions in a secure suggestion bar 330. After receiving a selection of a specific suggestion presented in the secure suggestion bar 330, the selected suggestion can be provided to the host application 410 via an inter-process communication API.

To generate suggestions for presentation on the secure suggestion bar 330, host application 410 can send a message to KSB process 420 when a data field of the host application 410 is selected by the user. For example, each data field on GUI 300 can be configured with a field type identifier 412. When host application 410 sends the message to KSB process 420, host application 410 can include the field type identifier 412 for the selected data field in the message sent to the KSB process 420. When KSB process 420 receives a message including the field type identifier for the user selected data field, suggestion module 424 can send message identifying the field type 426 of the user selected data field to expert module 430. In the event that the field type identifier 412 is not included in the message, the heuristics module 425 can determine a semantic meaning for the data field based on context associated with the host application 410 and/or data field.

In various embodiments, data field heuristics include, for example whether the data field is a search text field, keywords associated with the data field, and placeholder text for the data field. Additional heuristics include a type associated with the application or capabilities associated with the application. For example, the data field heuristics can determine that the data field is a search text field in part based on whether the application supports an automobile infotainment interface (e.g., Apple Car Play, Android Auto). Metadata associated with a data field can indicate whether the field expects a phone number, and address, a name, an employer, a business name, or other types of data. Once a determination is made as to the type of input expected by a data field, the expert module 430 can analyze the contacts database in light of text input and the type of input expected by the text input field. The one or more suggestion engines can then generate a set of suggestions that may be provided for the data field. The top suggestion can then be securely displayed via the secure suggestion bar 330.

Expert module 430 can be a software module, library, etc., loaded into KSB process 420. Expert module 430 can be a software process separate from KSB process 420 and/or host application 410. For example, expert module 430 can be a process or component of the operating system 404 of user device 402 that searches for, obtains, and/or provides relevant user information associated with the user to authorized clients of user device 402. For example, first party applications and processes (e.g., operating system 404, KSB process 420, expert module 430, etc.) may be authorized to access the user information provided by expert module 430 because expert module 430 is also a first party process, while other processes (e.g., third party applications) may not be given direct access to expert module 430 and/or the user information provided by expert module 430.

Expert module 430 can include experts that are configured to find, obtain, and provide certain types of information on user device 402. For example, expert module 430 can include contacts expert 432 for obtaining contact information from various sources on user device 402. Expert module 430 can include a location expert 434 for obtaining location information from various sources on user device 402. Expert module 430 can include an event expert 436 for obtaining event information from various sources on user device 402. The contacts autocomplete keyboard as described herein primarily presents suggestions that are generated by the contacts expert 432.

Expert module 430 can provide a message to the expert module 430 that includes a field type 426 identifier for a selected data field of the host application 410. Field type 426 may be the field type identifier 412 received from the host application 410 and/or a field type that is determined by the heuristics module 425. Each individual expert of the expert module 430 can determine if that expert is configured to provide information in response to receiving the field type identifier. A particular field type may be handled by only one expert or may be handled by multiple experts.

If an expert is configured to find and/or provide information for the field type identifier received by expert module 430, the expert can search various hardware sources, configuration sources, event sources, communication sources, and/or application sources for user information relevant to the field type identifier. For example, the contacts expert 432 can search the contacts database on the user device 402 to determine a set of suggestion candidates (candidate data 440) to present to the KSB process 420. Suggestion module 424 can then present the selected suggestions on secure suggestion bar 330 without providing the selected suggestions (e.g., user information) to host application 410.

Contact information stored on user device 402 can be information that is synchronized to and/or from other user devices associated with the user. For example, the user may have multiple user devices (e.g., laptop computer, smartphone, tablet computer, smartwatch, etc.). The changes to entries in the contact database of one system may be synchronized with other user devices associated with the same user.

Figure 5:
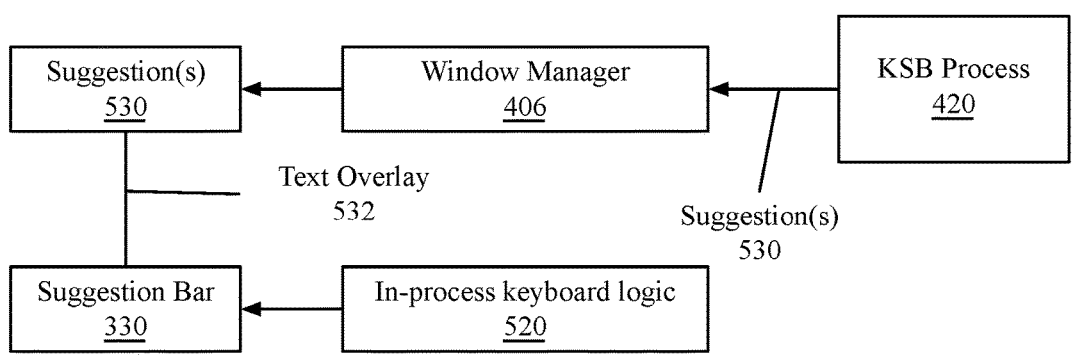
FIG. 5 illustrates a system to enable the secure presentation of suggestions based on a contacts database.

FIG. 5 illustrates a system 500 to enable the secure presentation of suggestions based on a contacts database. In one embodiment, the secure suggestion bar 330 may be drawn by in-process keyboard logic 520 that executes within the process space of the host application 410. Alternatively, the secure suggestion bar 330 may be drawn by logic of the host application 410. To prevent the host application from reading suggestions that are presented via the secure suggestion bar 330, the suggestion bar may be drawn as a blank UI region. The KSB process 420 can send an API message to the window manager 406 with a request to display one or more suggestions 530. The window manager 406 can then display the one or more suggestions 530 as a text overlay 532 over the UI region of the secure suggestion bar 330 during presentation of the UI. Thus, system 500 enables suggestions to be securely presented to a user without exposing those suggestions (and the contacts data associated with those suggestions) to the host application 410.

Figure 6:
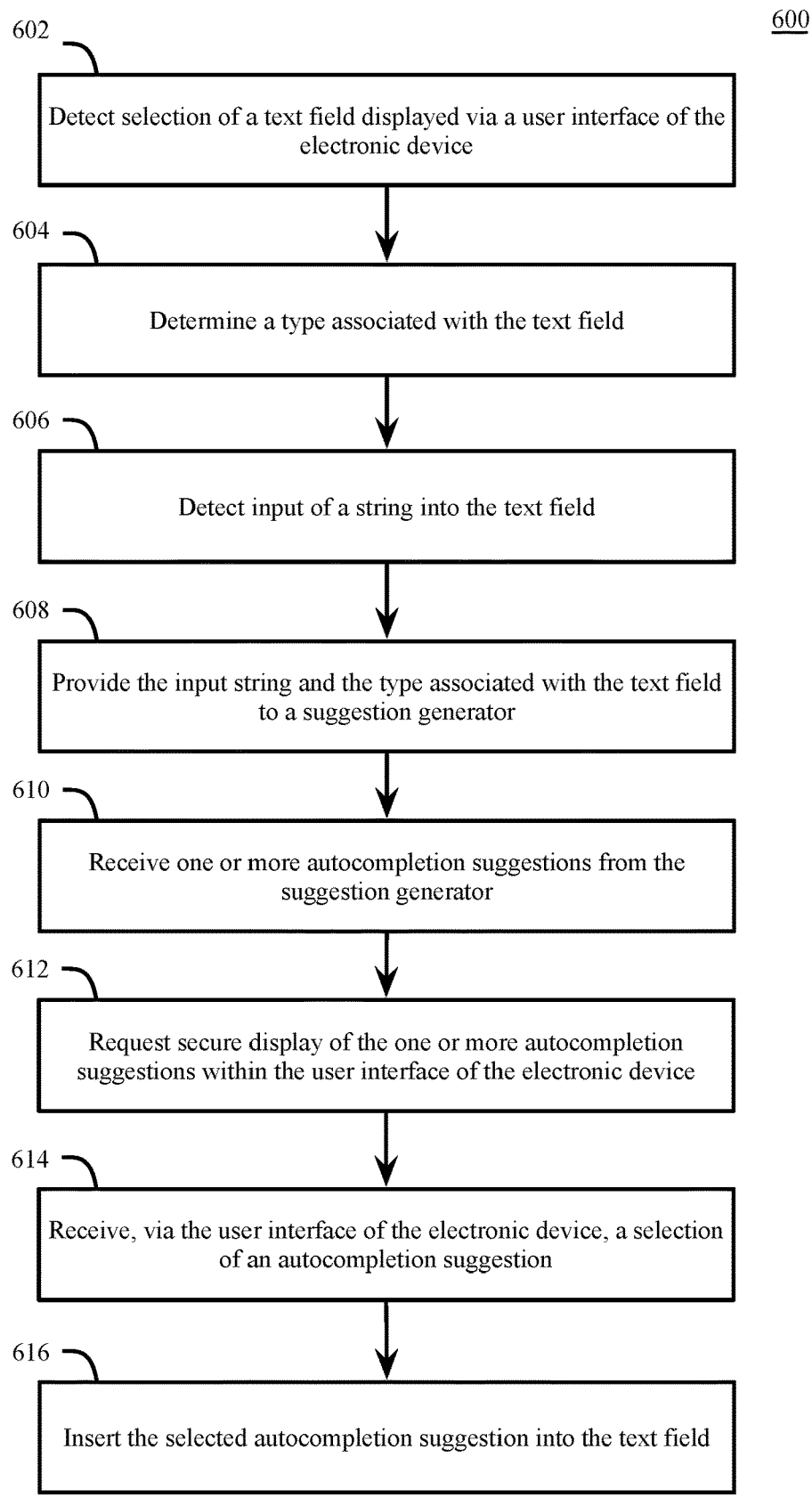
FIG. 6 illustrates a method to enable a contacts autocompletion keyboard, according to embodiments described herein.

FIG. 6 illustrates a method 600 to enable a contacts autocompletion keyboard, according to embodiments described herein. Method 600 can be implemented by keyboard and suggestion logic described herein (e.g., KSB process 420) to provide autocompletion suggestions based on a contact database of a user, even when the application for which the suggestions are being generated does not have access to the contacts database of the user. In various embodiments, autocompletion suggestions based on other private data sources may also be presented using similar techniques.

Method 600 includes performing operations to detect selection of a text field displayed via a user interface of the electronic device (602). The user interface can be displayed for an application that is executed by the one or more processors of the electronic device. The electronic device can then determine a type associated with the text field (604). This determination can be performed by keyboard logic based on a field type provided for the text field. The determination can also be made using context-based heuristics in the event that the field type is not provided for the text field, as some applications do not populate the field type for all text fields.

In response to detecting input of a string into the text field (606), keyboard logic on the electronic device can provide the input string and the supplied or determined field type associated with the text field to a suggestion generator (608). The suggestion generator (e.g., expert module 430) can generate one or more autocompletion suggestions based on a contacts database on the electronic device. The suggestions can be generated without regard to whether the application for which the suggestions are generated has access to the contacts database of the electronic device.

The keyboard logic on the electronic device can then receive the one or more autocompletion suggestions from the suggestion generator (610). The keyboard logic can then request the secure display of the one or more autocompletion suggestions within the user interface of the electronic device (612). The secure display of the one or more autocompletion suggestions can be performed, for example, by a window manager of an operating system of the electronic device upon request from the keyboard logic. The one or more autocompletion suggestions can be displayed within the user interface from a memory location that is inaccessible to the application. In one embodiment the one or more autocompletion suggestions can be displayed as an overlay by the window manager over the UI region a suggestion bar that is drawn by the application or keyboard logic that executes within the process space of the application.

In the event the keyboard logic receives, via the user interface of the electronic device, a selection of an autocompletion suggestion of the one or more autocompletion suggestions (614), the keyboard logic can insert the selected autocompletion suggestion into the text field (616). The selected autocompletion suggestion can be inserted into the text field by providing the text of the autocompletion suggestion to the application.

Figure 7:
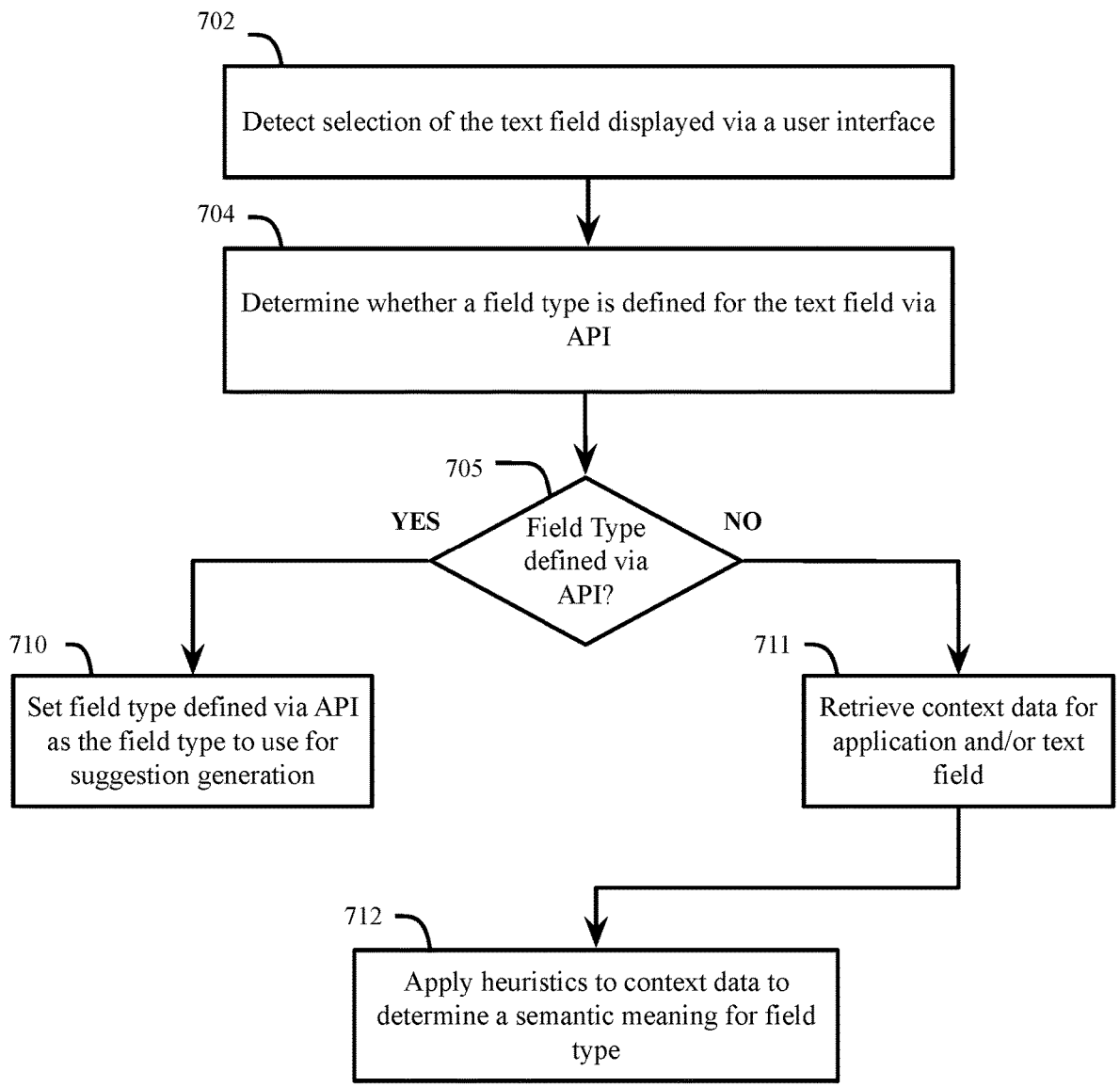
FIG. 7 illustrates a method to determine a field type for a text and/or data field presented by an application.

FIG. 7 illustrates a method 700 to determine a field type for a text and/or data field presented by an application. Method 700 can be performed by keyboard logic (e.g., heuristics module 425 of KSB process 420) on an electronic device. Method 700 includes for the keyboard logic to detect selection of the data field displayed via a user interface (702). Selection of the text field can be detected by a message sent from the application to the keyboard logic. The keyboard logic can then determine whether a field type is defined for the data field via API Field Type defined via a user interface API (704). If the field type is defined via the API ("yes", 705), the keyboard logic can set the field type as defined via API as the field type to use for suggestion generation (710). If the field type is not defined via the API ("no", 705), then the keyboard logic can retrieve context data for application and/or text field (711). The keyboard logic can then apply heuristics to context data to determine a semantic meaning for field type (712). As described above, the heuristics can include whether the data field is a search text field, keywords associated with the data field, and placeholder text for the data field. Additional heuristics include whether the application supports an automobile infotainment interface (e.g., Apple Car Play, Android Auto). Metadata associated with a data field can indicate whether the field expects a phone number, and address, a name, an employer, a business name, or other types of data.

Figure 8:
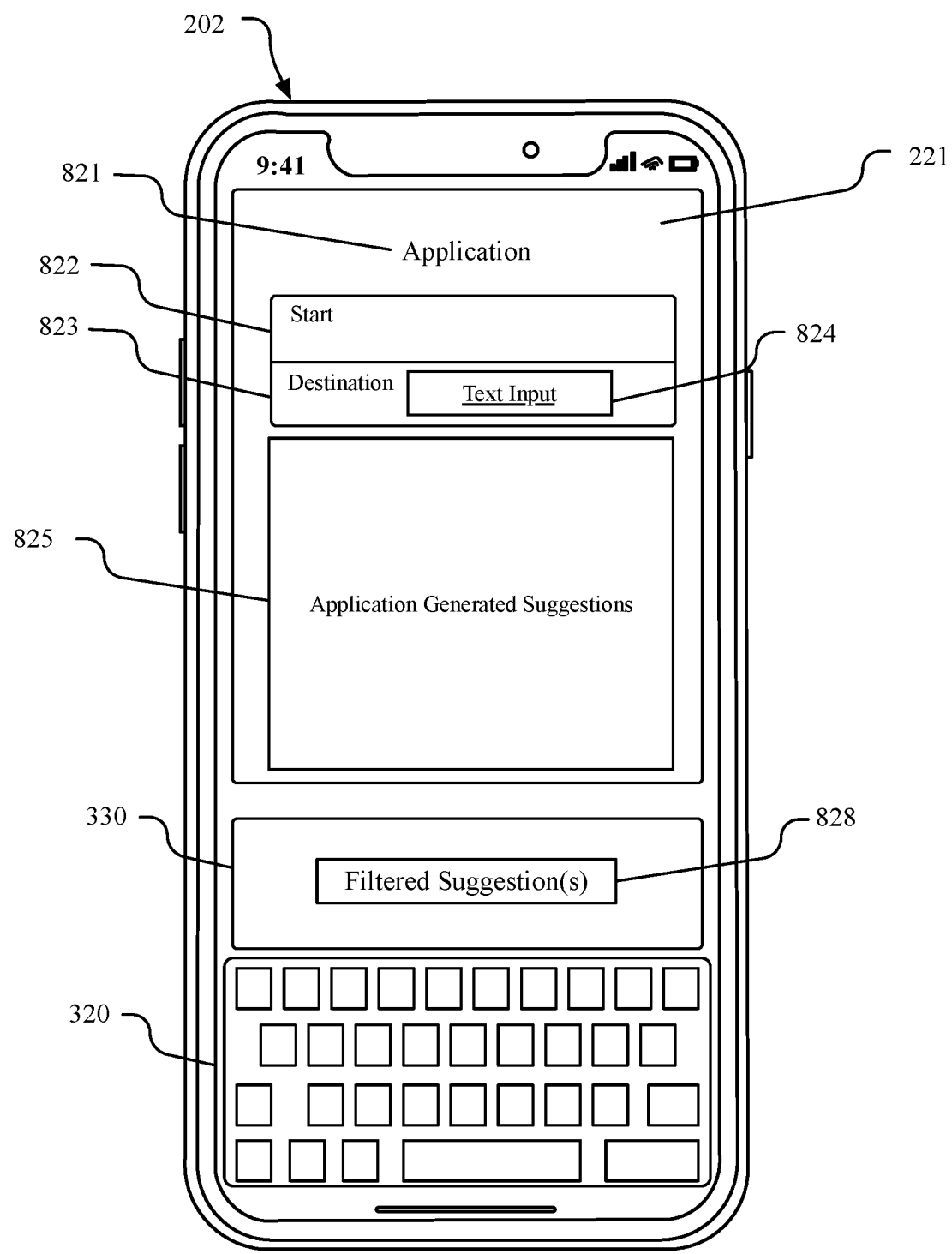
FIG. 8 illustrates text input for an application and the filtering of duplicate suggestions.

FIG. 8 illustrates text input for an application and the filtering of duplicate suggestions. As illustrated, a mobile device 202 can present a user interface of an application 821 on the display 221 of the device. The application can display a user interface including one or more text fields that can receive text input. Text input can be provided via a keyboard 320 that is presented on the display 221, where the display is a touch sensitive display that is configured to accept touch input. For example, the application 821 may be a navigation application that can present navigation directions to a user. The navigation application can include a start field 822 and a destination field 823. Either of the start field 822 and/or destination field 823 can receive text input 824 via the keyboard 320. In various embodiments, suggestions can be generated for any type of application. The type of suggestions that are generated can vary based on the type of application for which suggestions are generated.

Some applications can present an interface element to display application generated suggestions 825. The application generated suggestions can be generated based on input provided via the keyboard 320. The application generated suggestions 825 can be generated base on public and/or unprotected data, such as a maps database stored on the mobile device 202 or accessible via a network. The application generated suggestions 825 may also be generated based on private data that is stored on the device if the application 821 has been granted access to such data. For example, the text input 824 can be a portion of an address and the application generated suggestions 825 can be auto-completion suggestions for addresses that are generated based on a map database. If the application 821 has been granted access to a calendar on the mobile device 202, the application generated suggestions 825 may be generated based on location data specified within calendar events. If the application 821 has been granted access to a contacts database on the mobile device 202, the application generated suggestions 825 may be based on addresses, names, businesses or other data that is associated with contacts in the contacts database.

To prevent the display of duplicate suggestions, keyboard and suggestion logic on the user device 402 may scan memory associated with the application 821 to detect the application generated suggestions 825 that are being displayed by the application. For example, the view hierarchy of the application may be visible to the keyboard logic. Text objects associated with a autocompletion suggestion window associated with the application can be scanned to determine the autocompletion suggestions that are being presented by the application. Suggestions that are to be presented via the secure suggestion bar 330 that are duplicative of one or more suggestions in the application generated suggestions 825 may be removed and one or more filtered suggestion(s) 828 may be displayed.

While enabling the generation of autocompletion suggestions for an application while preventing access by the application to a contacts database is described herein, similar techniques can be applied to enable autocompletion while preventing access by the application to other private data sources. For example, autocompletion suggestions can be generated based on a location history stored on an electronic device, while preventing the application from accessing the location history.

Figure 9:
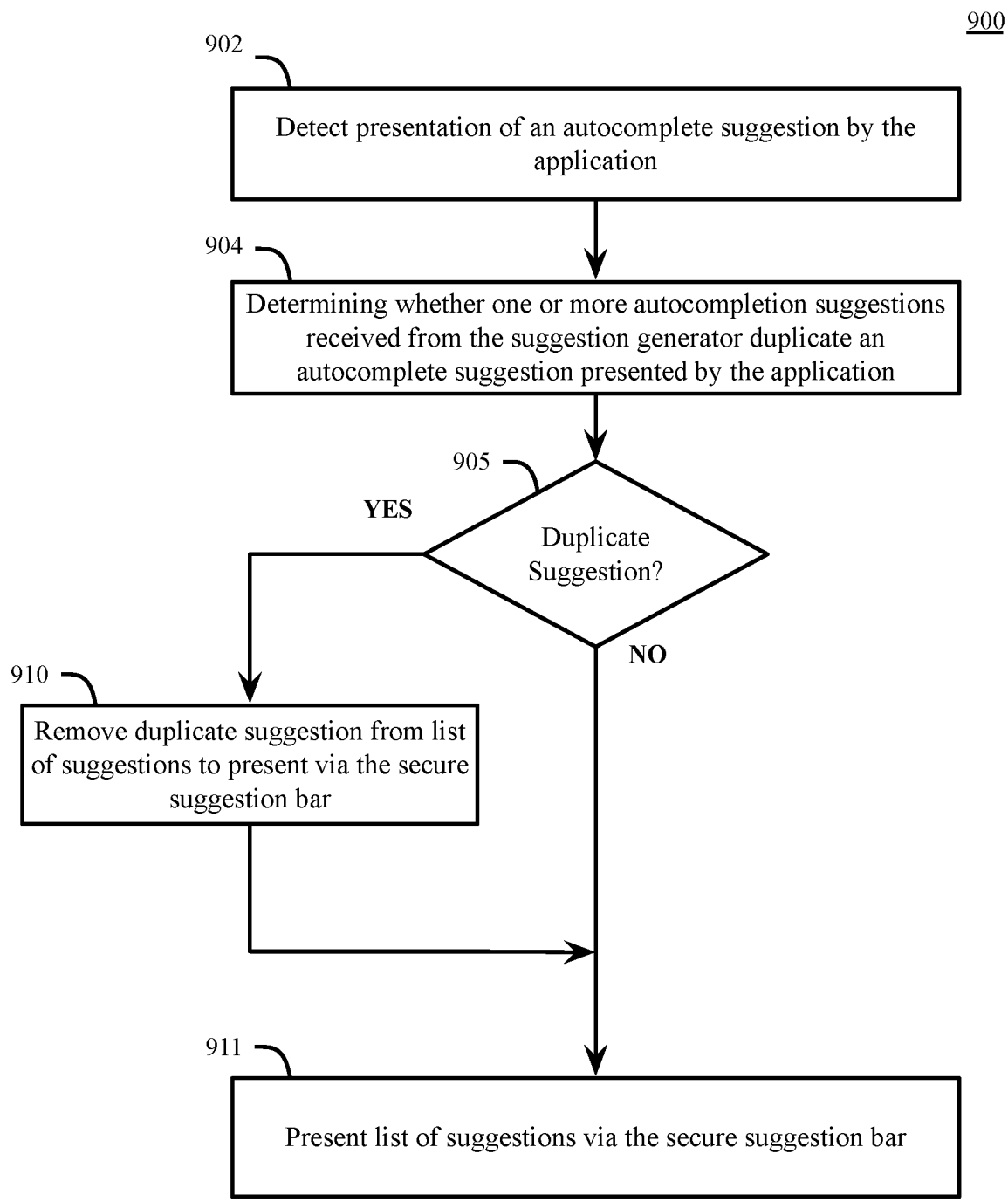
FIG. 9 illustrates a method of preventing the presentation of duplicative suggestions.

FIG. 9 illustrates a method 900 of preventing the presentation of duplicative suggestions. Method 900 can be performed by keyboard logic described herein, such as the suggestion module 424 of the KSB process 420. Method 900 includes for keyboard logic to detect presentation of an autocomplete suggestion by the application (902). The keyboard logic can then determine whether one or more auto-completion suggestions received from the suggestion generator duplicate an autocomplete suggestion presented by the application (904). Detecting the presentation of the autocompletion suggestion and determining whether a duplicate suggestion is being presented can be determined by scanning memory associated with the application or by querying a UI framework for UI data that is presented by the application via the UI framework. If a duplicate suggestion is found ("yes", 905), the keyboard logic can remove the duplicate suggestion from the list of suggestions to prevent via the secure suggestion bar (910). After removing the duplicate suggestion, or if no duplicate suggestion is found, the keyboard logic can present the list of suggestions via the secure suggestions bar (911). The list of suggestions can be presented via the secure suggestions bar, for example, by requesting the display of the suggestions by the window manager of the operating system of the device upon which the keyboard logic executes.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 10:
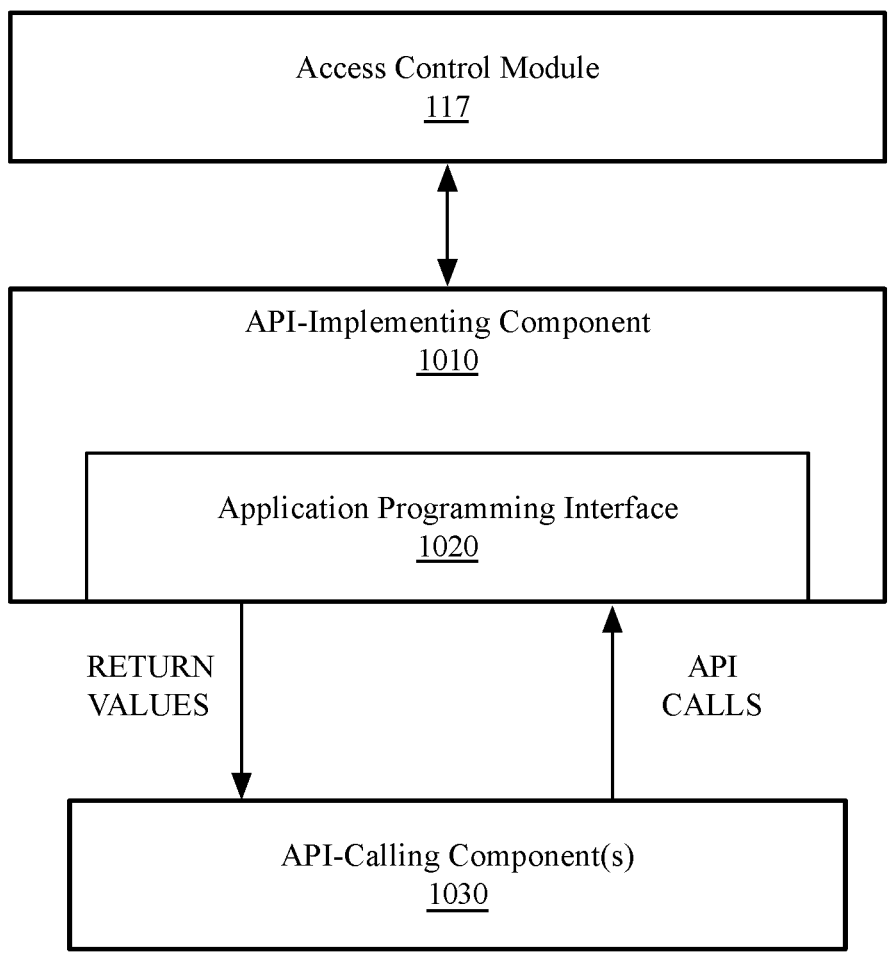
FIG. 10 is a block diagram illustrating an exemplary API architecture, which may be used in some embodiments of the invention.

FIG. 10 is a block diagram illustrating an exemplary API architecture, which may be used in some embodiments of the invention. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

In one embodiment, the access control module 117 described herein can be communicatively coupled with the API-implementing component 1010 to mediate access to privacy related system resources such as the user data and system resources illustrated in FIG. 2. Before the API-implementing component 1010 can perform some operations, the API implementing component 1010 can communicate with the access control module 117 to determine if such operations can be performed.

Figure 11A:
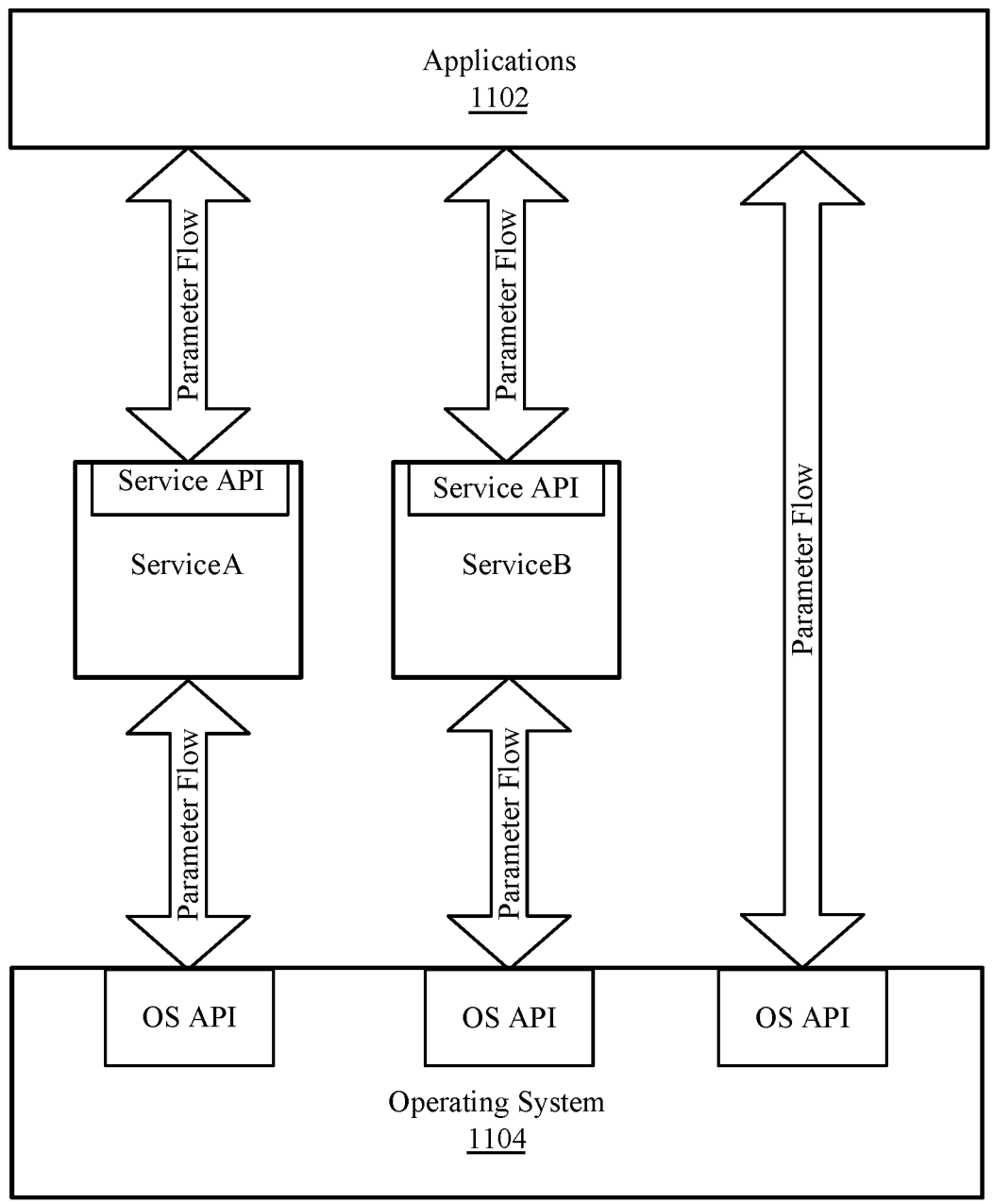
FIG. 11A-11B are block diagrams of exemplary API software stacks, according to embodiments.
Figure 11B:
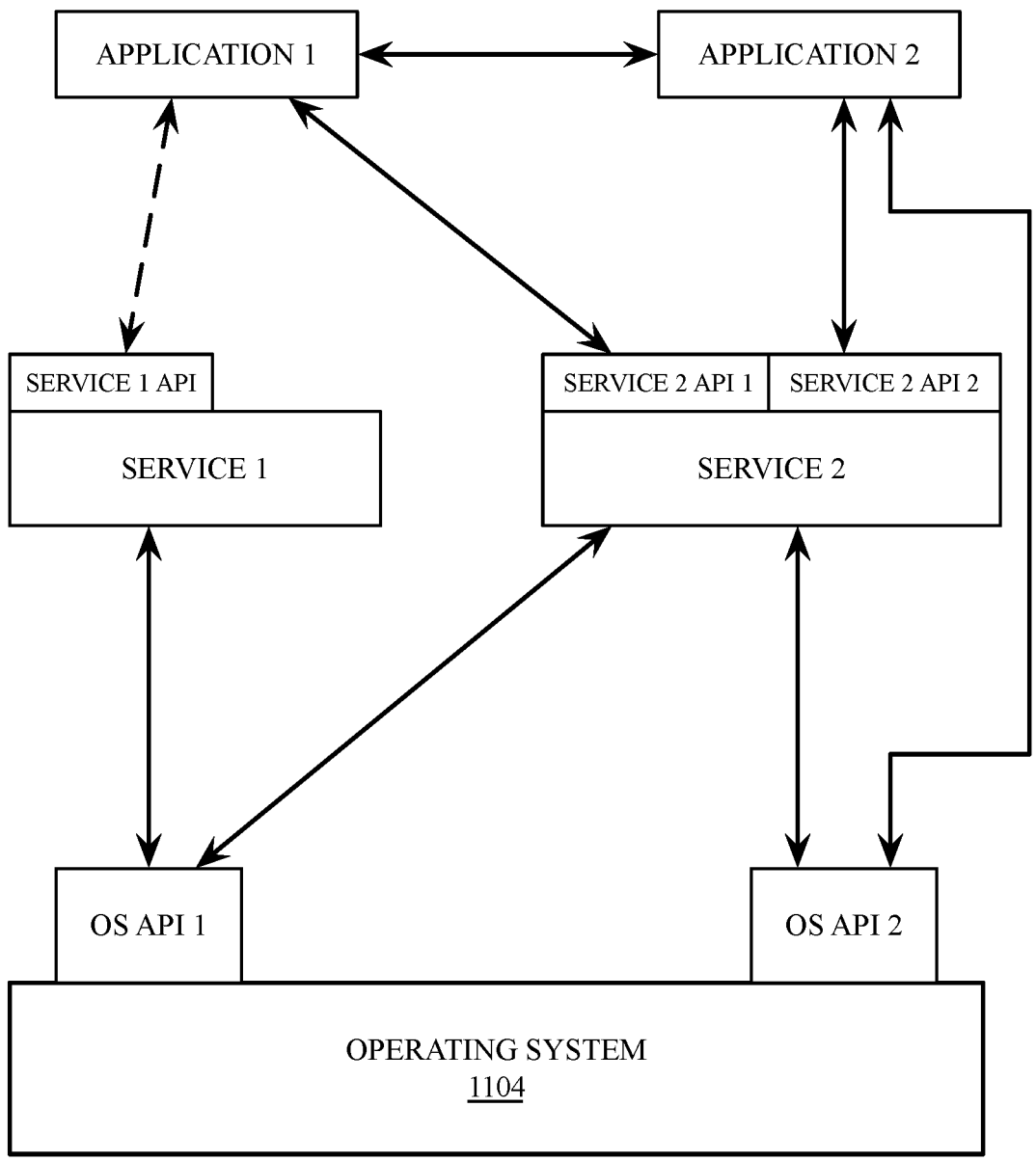

FIG. 11A-11B are block diagrams of exemplary API software stacks 1100, 1110, according to embodiments. FIG. 11A shows an exemplary API software stack 1100 in which applications 1102 can make calls to Service A or Service B using Service API and to Operating System 1104 using an OS API. Additionally, Service A and Service B can make calls to Operating System 1104 using several OS APIs.

FIG. 11B shows an exemplary API software stack 1110 including Application 1, Application 2, Service 1, Service 2, and Operating System 1104. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In one embodiment, the access control module 117 described herein can limit the types of interactions that applications can perform relative to each other. For example, in one embodiment Application 1 can exercise control over Application 2. The access control module 117 can determine whether Application 1 has permission to control Application 2. Furthermore, the access control module 117 can be used to limit the types of events that a system can receive programmatically. The access control module 117 can also prevent applications from using network sharing of local folders to bypass file system protections.

Figure 12:
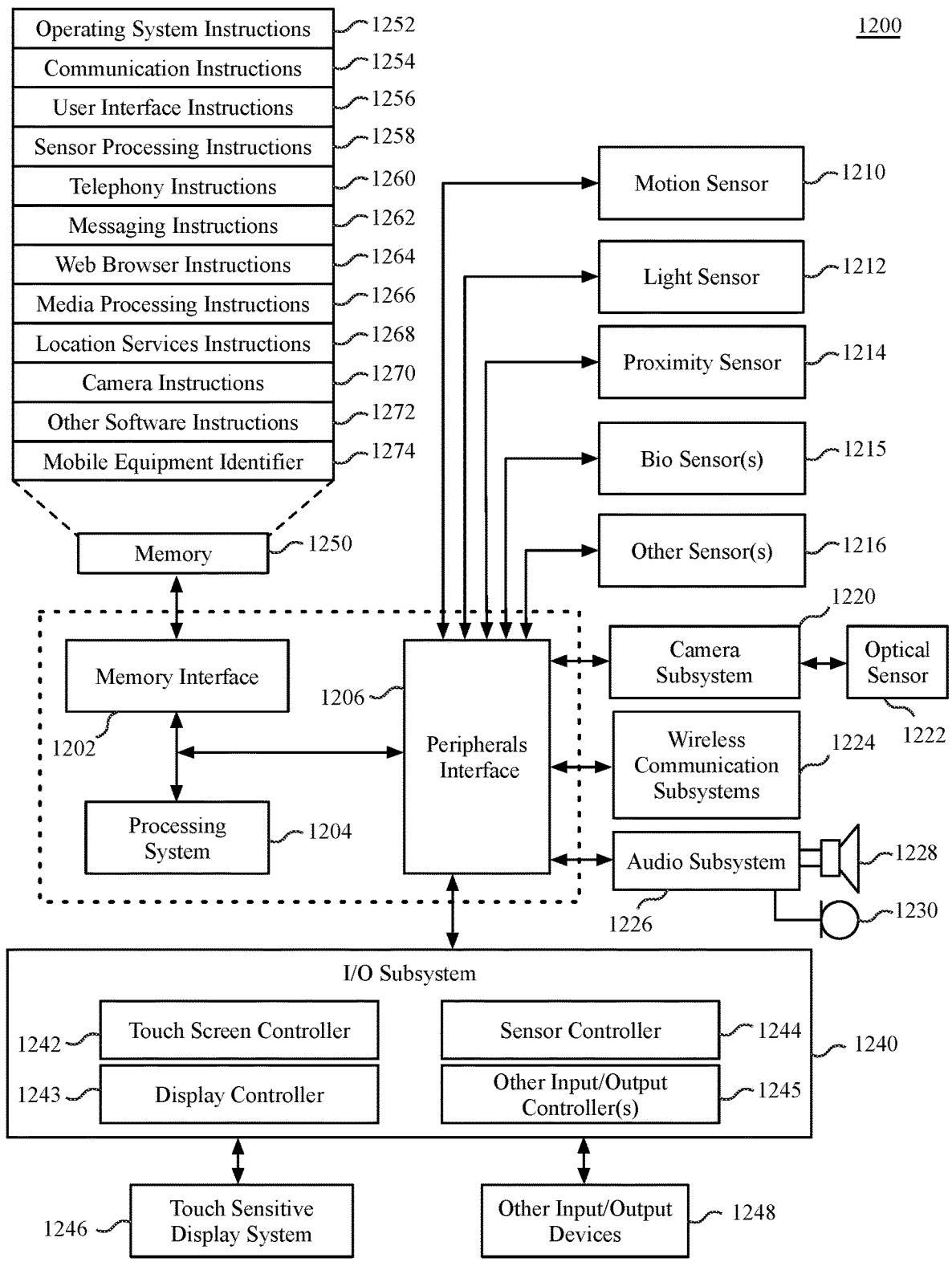
FIG. 12 is a block diagram of a device architecture for a mobile or embedded device, according to an embodiment.

FIG. 12 is a block diagram of a device architecture 1200 for a mobile or embedded device, according to an embodiment. The device architecture 1200 includes a memory interface 1202, a processing system 1204 including one or more data processors, image processors and/or graphics processing units, and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

An audio subsystem 1226 can be coupled to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
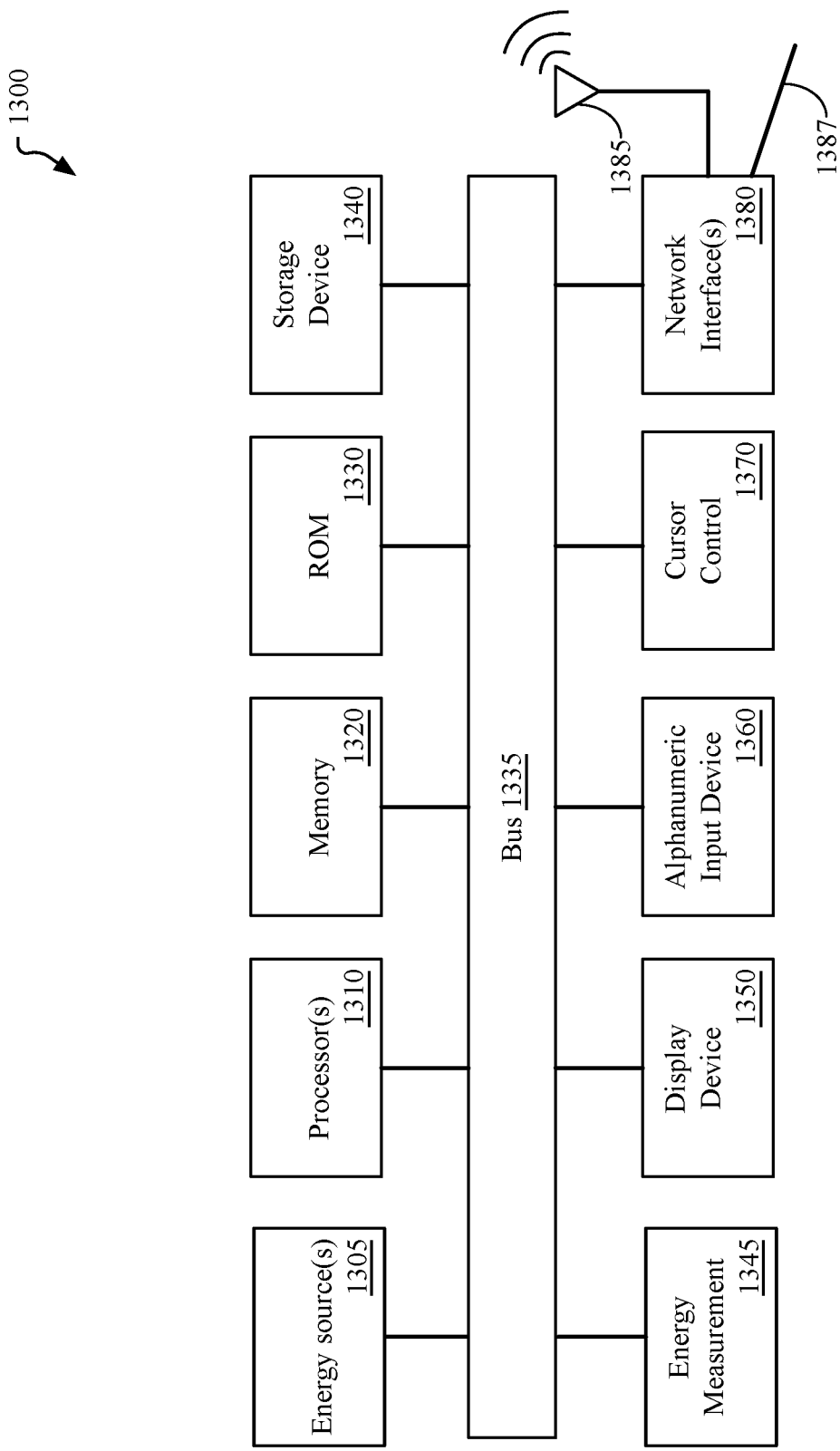
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include memory 1320, which can be random access memory (RAM) or other dynamic storage device coupled to the bus 1335. The memory 1320 may store information and instructions that may be executed by processor(s) 1310. The memory 1320 may also be used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides for a non-transitory machine-readable medium storing instructions which, when executed by one or more processors of an electronic device, cause the one or more processors to perform operations comprising detecting selection of a text field displayed via a user interface of the electronic device, the user interface displayed for an application executed by the one or more processors, determining a type associated with the text field, detecting input of a string into the text field, providing the input string and the type associated with the text field to a suggestion generator, the suggestion generator to generate one or more autocompletion suggestions, the one or more autocompletion suggestions generated based on a contacts database on the electronic device, receiving the one or more autocompletion suggestions from the suggestion generator, requesting secure display of the one or more autocompletion suggestions within the user interface of the electronic device, wherein the secure display of the one or more autocompletion suggestions displays the one or more autocompletion suggestions within the user interface via a memory location that is inaccessible to the application, receiving, via the user interface of the electronic device, a selection of an autocompletion suggestion of the one or more autocompletion suggestions, and inserting the selected autocompletion suggestion into the text field. Selection of the text field displayed via the user interface can be detected by detecting a touch input to select the text field. Inserting the selected autocompletion suggestion includes writing the selected autocompletion suggestion to a memory location that is accessible to the application.

One embodiment provides an electronic device comprising a display device, a memory device coupled with the display device, an input device, and one or more processors coupled with the display device, the memory device, and the input device. The one or more processors can be configured to execute instructions stored in the memory device, where the instructions cause the one or more processors to detect selection of a text field displayed via a user interface of the electronic device, the user interface displayed on the display device on behalf of an application configured for execution by the one or more processors, detect input of a string into the text field, the string input via the input device, generate one or more autocompletion suggestions based on the string and securely display the one or more autocompletion suggestions within the user interface. To securely display the one or more autocompletion suggestions includes to write the autocompletion suggestions to a portion of the memory that is inaccessible to the application and display, via the display device, the one or more autocompletion suggestions from the portion of the memory. After display of the one or more autocompletion suggestions, the one or more processors can receive, via the input device, selection of an autocompletion suggestion of the one or more autocompletion suggestions and insert the selected autocompletion suggestion into the text field in response to receipt of the selection of the autocompletion suggestion. The application does not have access to the autocompletion suggestions while they are securely displayed. When an autocompletion suggestion is selected, the selected suggestion is made accessible to the application.

One embodiment provides for a non-transitory machine-readable medium storing instructions which, when executed by one or more processors of an electronic device, cause the one or more processors to perform operations of a method as described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A non-transitory machine readable medium storing instructions which, when executed by one or more processors of an electronic device, cause the one or more processors to perform operations comprising:
generating one or more autocompletion suggestions based on a string input via a text field;
requesting display of one or more autocompletion suggestions from a memory location within the electronic device that is inaccessible to an application for which the autocompletion suggestions are presented;
receiving a selection of an autocompletion suggestion of the one or more autocompletion suggestions; and
inserting the selected autocompletion suggestion into the text field in response to receiving the selection of the autocompletion suggestion.

2. The non-transitory machine readable medium as in claim 1, wherein inserting the selected autocompletion suggestion into the text field includes enabling access for the application to the selected autocompletion suggestion.

3. The non-transitory machine readable medium as in claim 1, the operations further comprising:
determining a type associated with the text field; and
generating one or more autocompletion suggestions using on the string and the type.

4. The non-transitory machine readable medium as in claim 3, wherein determining the type associated with the text field includes determining whether a semantic meaning for the text field is defined via an application programming interface.

5. The non-transitory machine readable medium as in claim 3, wherein determining the type associated with the text field includes analyzing placeholder text associated with the text field.

6. The non-transitory machine readable medium as in claim 3, wherein determining the type associated with the text field additionally includes determining a type for the application.

7. The non-transitory machine readable medium as in claim 1, the operations further comprising generating one or more autocompletion suggestions using a contacts database on the electronic device.

8. The non-transitory machine readable medium as in claim 7, the operations additionally comprising gating access to the contacts database by the application via a privacy control system of the electronic device.

9. The non-transitory machine readable medium as in claim 1, the operations additionally comprising:
detecting input of the string into the text field via keyboard logic within a process space of the application;
determining a type associated with the text field; and
receiving the string and the type associated with the text field from the keyboard logic within the process space of the application at keyboard logic outside of a process space of the application;
requesting, by the keyboard logic outside of a process space of the application, generation of the one or more autocompletion suggestions based on the string and the type associated with the text field.

10. The non-transitory machine readable medium as in claim 1, the operations additionally comprising:
detecting presentation of an autocomplete suggestion by the application;
determining whether the one or more autocompletion suggestions duplicate the autocomplete suggestion by the application; and
removing a suggestion from the one or more autocompletion suggestions when the suggestion is a duplicate of the autocomplete suggestion by the application.

11. An electronic device comprising:
a display device;
a memory device coupled with the display device;
an input device; and
one or more processors coupled with the display device, the memory device, and the input device, the one or more processors to execute instructions stored in the memory device, wherein the instructions cause the one or more processors to:
generate one or more autocompletion suggestions based on a string input via a text field;

display the one or more autocompletion suggestions by writing the one or more autocompletion suggestions to a portion of the memory within the electronic device that is inaccessible to an application for which the autocompletion suggestions are presented and displaying, via the display device, the one or more autocompletion suggestions from the portion of the memory;

receive selection of an autocompletion suggestion of the one or more autocompletion suggestions; and insert the selected autocompletion suggestion into the text field in response to receipt of the selection of the autocompletion suggestion.

12. The electronic device as in claim 11, wherein to insert the selected autocompletion suggestion into the text field includes to enable the application to access a portion of the memory that stores the selected autocompletion suggestion.

13. The electronic device as in claim 11, wherein to generate the one or more autocompletion suggestions to:

provide the string and a type associated with the text field to a suggestion generator associated with an operating system of the electronic device, the suggestion generator to generate one or more autocompletion suggestions based on the string, the type associated with the text field, and a contacts database on the electronic device; and receive the one or more autocompletion suggestions from the suggestion generator.

14. The electronic device as in claim 13, wherein to determine a type associated with the text field includes to determine whether a semantic meaning for the text field is defined via an application programming interface.

15. The electronic device as in claim 14, wherein to determine a type associated with the text field includes to:

determine that a semantic meaning for the text field is not defined; and determine the type associated with the text field based on placeholder text associated with the text field or an application type associated with the application.

16. The electronic device as in claim 11, wherein the one or more processors are further to:

detect presentation of an autocomplete suggestion by the application; determine whether the one or more autocompletion suggestions duplicate the autocomplete suggestion by the application; and remove a suggestion from the one or more autocompletion suggestions when the suggestion is a duplicate of the autocomplete suggestion by the application.

17. A method comprising:

generating one or more autocompletion suggestions based on a string input via a text field;

requesting display of the one or more autocompletion suggestions from a memory location within an electronic device on which the one or more autocompletion suggestions are displayed, the memory location being inaccessible to an application for which the autocompletion suggestions are presented;

receiving a selection of an autocompletion suggestion of the one or more autocompletion suggestions; and inserting the selected autocompletion suggestion into the text field in response to receiving the selection of the autocompletion suggestion.

18. The method as in claim 17, further comprising:

determining a type associated with the text field; and generating one or more autocompletion suggestions using on the string and the type using a contacts database on the electronic device, wherein application access to the contacts database is prevented and determining the type associated with the text field includes determining whether a semantic meaning for the text field is defined via an application programming interface, analyzing placeholder text associated with the text field, or determining a type for the application.

19. The method as in claim 18, wherein inserting the selected autocompletion suggestion into the text field includes enabling access for the application to the selected autocompletion suggestion.

20. The method as in claim 17, further comprising:

detecting presentation of an autocomplete suggestion by the application; determining whether the one or more autocompletion suggestions duplicate the autocomplete suggestion by the application; and removing a suggestion from the one or more autocompletion suggestions when the suggestion is a duplicate of the autocomplete suggestion by the application.

* * * * *